United States Patent [19]

Kobayashi et al.

[11] Patent Number: 4,937,463
[45] Date of Patent: Jun. 26, 1990

[54] FLAT FREQUENCY, CONSTANT VOLTAGE POWER SOURCE DEVICE

[75] Inventors: Koichi Kobayashi; Toyoshi Harada, both of Tokyo, Japan

[73] Assignee: Sanyo Denki Co., Ltd., Japan

[21] Appl. No.: 368,093

[22] Filed: Jun. 19, 1989

Related U.S. Application Data

[63] Continuation of Ser. No. 206,134, Jun. 13, 1988, abandoned.

[30] Foreign Application Priority Data

Jun. 15, 1987 [JP] Japan .................................. 62-148754
Jan. 27, 1988 [JP] Japan .................................. 63-16313

[51] Int. Cl.$^5$ ............................................. H02P 9/00
[52] U.S. Cl. ...................................... 307/87; 307/84; 322/16
[58] Field of Search ...................... 307/84, 85, 86, 87; 322/13, 16, 29, 32, 39; 290/30 R, 27, 32

[56] References Cited

U.S. PATENT DOCUMENTS

| | | |
|---|---|---|
| 3,235,743 | 2/1956 | Ryerson et al. ........................ 307/87 |
| 3,444,387 | 5/1969 | Billings et al. ......................... 307/87 |
| 3,497,711 | 2/1970 | Wuttig ................................... 307/87 |
| 3,588,519 | 6/1971 | Luebrecht ............................. 307/87 |
| 3,609,388 | 9/1971 | Hemmenway ........................ 307/87 |
| 4,575,671 | 4/1986 | Lee et al. ............................... 307/84 |

*Primary Examiner*—David Smith, Jr.
*Attorney, Agent, or Firm*—Leydig, Voit & Mayer

[57] ABSTRACT

A flat frequency, constant voltage power source device provided for parallel operation of a plurality of electric generators is arranged to have a starting sequence determination means which automatically determines which one of the electric generators is to be started initially and places the remaining ones of the electric generators sequentially into the parallel operation with the initially started generator, the plurality of the electric generators sequentially satisfying conditions for their parallel operation and being smoothly placed in parallel operation.

2 Claims, 8 Drawing Sheets

FLAT FREQUENCY, CONSTANT VOLTAGE POWER SOURCE DEVICE

This application is a continuation of application Ser. No. 07/206,134 filed Jun. 13, 1988 (now abandoned).

TECHNICAL BACKGROUND OF THE INVENTION

This invention relates to a flat frequency, constant voltage power source device including a plurality of A.C. electric generators for smooth parallel operation.

DISCLOSURE OF PRIOR ART

Figure 14:
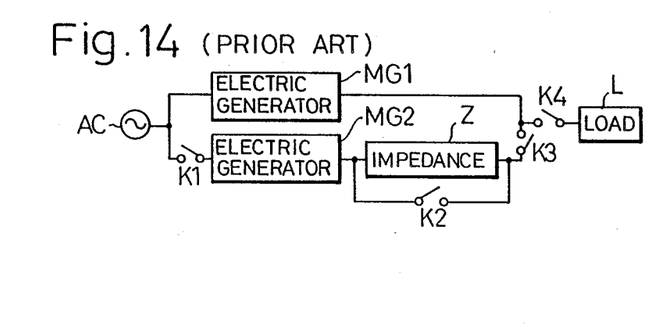
FIG. 14 is a block diagram showing a conventional flat frequency, constant voltage power source device.

Known flat frequency and constant voltage power source device of the kind referred to comprises, as shown, for example, in FIG. 14, a plurality of electric generators MG1, MG2 each of which includes an integral induction motor and a generator, i.e., a motor generator set. These electric generators MG1, MG2 are connected to a commercial alternating current source AC and to a load L. A switch K1 is inserted between source AC and the electric generator MG2. A circuit of an impedance Z and a switch K2 connected in parallel are inserted at the output of the generator MG2. A switch K3 is connected between the output of the parallel circuit and the output of the generator MG1. Still another switch K4 is connected between a junction point of the switch K3 with the generator MG1 and the load L.

When in this arrangement only the electric generator MG1 is supplying power to the load L but the other generator MG2 is to be put into parallel operation, the switch K1 is initially closed to start the other generator MG2. When its output voltage has reached a predetermined frequency and voltage level, the switch K3 is closed to place the other generator MG2 in parallel operation with the generator MG1 through the impedance Z. Upon the closing of switch K3, an electric current corresponding to the phase difference between the electric generators MG1 and MG2 flows through the impedance Z. Since the electric generators MG1 and MG2 are different from each other in the extent of their slip, their output frequencies are different from each other so that the phase difference varies periodically. The current through the impedance Z is monitored. The switch K4 is closed when that current becomes relatively small, that is, when the phase difference is close to zero, to complete placing generation MG2 into parallel operation with the generator MG1. As the switch K4 is closed, a synchronizing power both electric generators MG1 and MG2, and their parallel operation can be thereby maintained.

In this known device, however, there are unresolved problems such as the use of the impedance Z a reactor or resistor, which must be provided along with the switch K2, their mounting space must be provided with consideration for the heat they generate and the completion of the parallel connection requires a high level of skill for smooth execution.

FIELD OF ART

A primary object of the present invention is, therefore, to provide a flat frequency, constant voltage power source device which has solved the foregoing problems and can automatically determine the starting sequence of for plurality of electric generators once a start signal has been given and can automatically start the generator by establishing easily satisfied conditions for their parallel operation.

Another object of the present invention is to provide a flat frequency, constant voltage power source device which requires no specially trained operator for starting the electric generators in the device.

Still another object of the present invention is to provide a flat frequency, constant voltage power source device which allows remote operation for starting the electric generators.

A further object of the present invention is to provide a flat frequency, constant voltage power source device which can achieve parallel operation of a plurality of electric generators without requiring any impedance means, switch means and the like which have been employed only upon placing the generators into parallel operation.

According to the present invention, the foregoing objects can be achieved by a flat frequency, constant voltage power source device in which a starting sequence determination means for a plurality of electric generators is actuated upon receipt of a start signal to automatically determine which of the electric generators which is to be initially started and, after automatic starting of said determined electric generator and shifting thereof into a state capable of feeding power to a load, remaining ones of the electric generators are sequentially started and smoothly shifted into parallel operation with the initially started generator.

Many other objects and advantages of the present invention shall be made clear in the following description of the invention detailed with reference to preferred embodiments shown in accompanying drawings.

While the present invention shall now be explained with reference to the preferred embodiments shown in the accompanying drawings, it should be appreciated that the intention is not to limit the invention only to such embodiments shown but rather to include all alterations, modifications and equivalent arrangements possible within the scope of appended claims.

DISCLOSURE OF PREFERRED EMBODIMENTS

Figure 1:
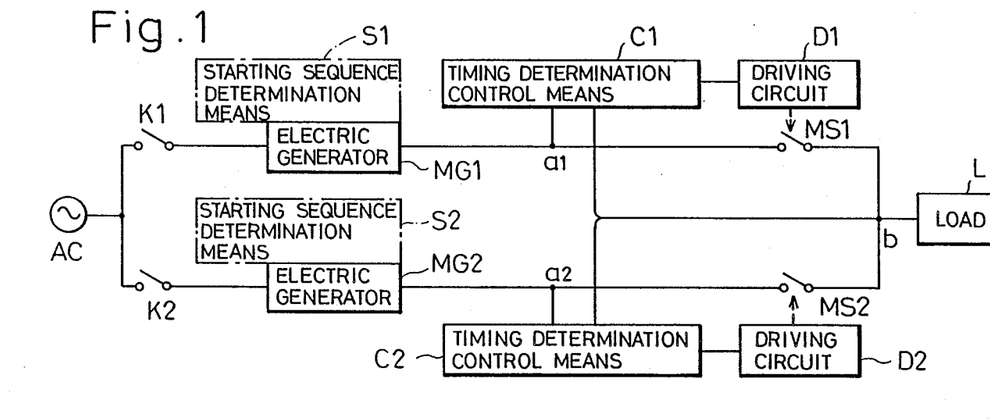
FIG. 1 is a block diagram showing an embodiment of the flat frequency, constant voltage power source device according to the present invention.

Referring to FIG. 1, there is shown an embodiment of the flat frequency, constant voltage power source device according to the present invention. Referring here to basic matters of the device before describing in detail its structure, it should be first appreciated that, when the difference between two AC voltages of different frequencies is determined a product of two trigonometric functions having frequencies corresponding to the sum and difference of the frequencies is obtained as shown by following formula:

$$E \sin 2\pi f_1 t - E \sin 2\pi f_2 t = 2E \sin 2\pi\{(f_1+f_2)/2\}\cdot t \times \cos 2\pi\{(f_1-f_2)/2\}\cdot t$$

Figure 2:
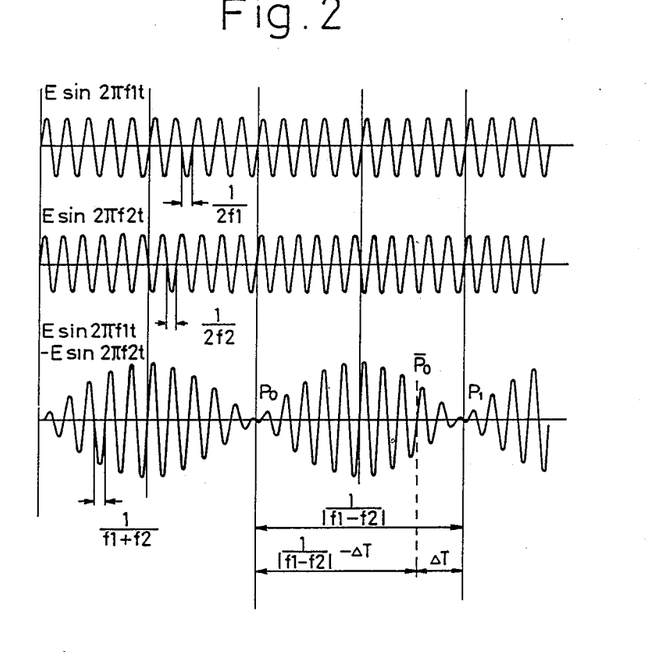
FIG. 2 is a waveform diagram of beat voltages in the device of FIG. 1.

That relationship is as shown in FIG. 2 for a voltage waveform.

That is, the difference between the two voltages produces a beat frequency signal having a half cycle of $1/|f_1-f_2|$. At time points Po and P1 in FIG. 2 when the beat signal voltage is zero, the phase difference between the two voltages is at its minimum.

When, in the flat frequency, constant voltage power source device of FIG. 1, a switch K1 and electromagnetic switch MS1 are closed and an electric generator MG1 is being operated, this generator MG1 as well as an electric generator MG2 are placed into parallel operation at the time points Po and P1 by closing another electromagnetic switch MS2 of the output circuit. Then the generators can be placed into parallel operation at the time when the phase difference between the two voltages is the minimum, so that any transient fluctuation in the voltage supplied to the load can minimized.

In practice, on the other hand, the electromagnetic switch MS2 involves a time lag in its actuation. Even if the switch MS2 is actuated at the time point Po or P1, it will be practically closed only at a time delayed from point Po or P1, when the phase difference between the both voltages has increased. Accordingly, it is desired that the device complete the closing of the electromagnetic switch MS2 at the time of the minimum phase difference.

It is assumed here that the actuation delay time of the electromagnetic switch MS2 is $\Delta T$, which includes all of delay times such as a delay involved in a driving circuit D2 for the switch MS2, any mechanical actuating delay of the switch MS2 itself and the like, after the transmission of an instruction for closing the switch by a timing determination control circuit C2. Here, the cycle of the respective two voltages is observed and their frequencies $f_1$ and $f_2$ are obtained.

On the basis of this information, the instruction for closing the electromagnetic switch MS2 is generated at a time point $\overline{Po}$ corresponding to a subtraction of the delay time $\Delta T$ of the particular switch from the half beat cycle $1/|f_1-f_2|$ and referred to the time Po as the base point. Thereby the closing of the electromagnetic switch MS2 is completed at the time P1, after delay time $\Delta T$ has elapsed.

Taking now the time point Po of the zero beat voltage into account, the actuation delay time $\Delta T$ of the electromagnetic switch MS2 is set to be 0.05 sec when the frequencies of the two voltages are to be 49.5 Hz and 50 Hz, respectively, meaning the half beat cycle is 2 sec. Therefore, the generation by the control circuit C2 of the instruction for the switch closing takes place at the time $\overline{Po}$ after elapsing of $2-0.05=1.95$ sec from the detection of the zero beat voltage time Po. The electromagnetic switch MS2 can be closed at the time point P1 after 0.05 sec has elapsed, that is, at the moment of the minimum phase difference.

After establishment of the parallel operation, it is likely that the phase of the voltage higher in the frequency will advance as the load becomes larger, and the latter will act, for example, to lower the speed of the electric generator MG2 and consequently the frequency of the particular voltage.

The voltage of a lower frequency is apt to lag so that the load share becomes smaller and the frequency of the voltage from the generator MG1 shows almost no descent. Thus, the output frequencies of the two electric generators MG1 and MG2 eventually come into coincidence and became steady and flat.

Figure 3:
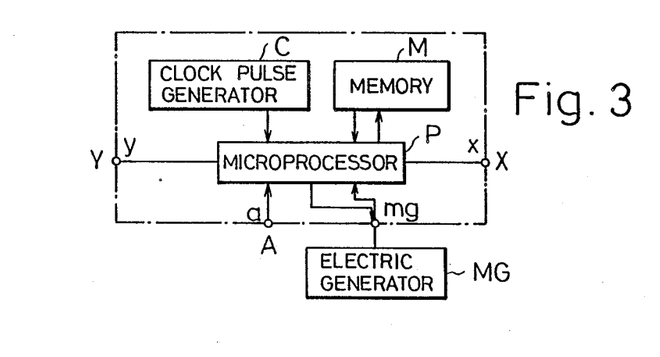
FIG. 3 is a block diagram showing a starting sequence determination means embodiment employed in the device of FIG. 1.

The arrangement of a main part of the power source device in FIG. 1 shall be detailed in the following. Referring now to FIG. 3, there is shown a starting sequence determination means provided in association with the electric generator MG. The starting sequence determination means comprises a digital circuit including a microprocessor P. In the present instance, the microprocessor P is connected to a clock pulse generator C and a memory M, and collects data denoting the state of the generator MG through an input terminal a for a start signal A and a terminal mg at which the means is connected to the generator MG. The starting instructions for the generator MG are also transmitted through the terminal mg. Further, a signal X from the microprocessor P is transmitted out of a terminal x, and a signal Y from the adjacent microprocessor for another electric generator is received through an input terminal y.

The arrangement for controlling the electric generator MG continues functioning even when the associated generator has ceased its rotation. That is, the starting sequence determination means as in FIG. 3 is kept in its operating state, and the microprocessor P thus carries out the signal processing in synchronism with the clock signals from the clock pulse generator C.

In the present instance, information for determining if the electric generator MG can be started or not, such as data denoting whether or not the generator MG is receiving the input, whether or not the voltage and frequency of the generator are normal and so on, are collected through the terminal mg and are stored in the memory M. Upon receipt of the externally provided start signal A, the microprocessor P starts the processing required for the start sequence determination. When it is determined in view of the contents in the memory M that the start preparation of the generator MG is completed, the signal X denoting the completion of the start preparation is provided out of the terminal x. When it is detected that the signal Y has not reached the terminal y from the other electric generator, the start signal A is provided to the generator MG. Upon starting of the generator MG, the transmission of the signal X ceases if the signal Y arrives while the signal X is being transmitted and during a detecting period in which the presence or absence of the signal Y from another electric generator is being detected, the microprocessor P stops the transmission of signal X and starts the processing required for a new starting sequence determination. When the signal Y is received prior to the transmission of the signal X, on the other hand, the microprocessor P interrupts the processing of the starting sequence determination, but starts again the processing when the absence of the signal Y is detected.

While in the illustrated case of FIG. 3 the microprocessor P has been referred to as being for use as the starting sequence determination means, the microprocessor may be equally effectively employed as a control means for the electric generator for data processing the than the starting sequence determination, such as sequence function upon starting of generators, evaluation of the sequence operation, operational administration and so on.

Figure 4:
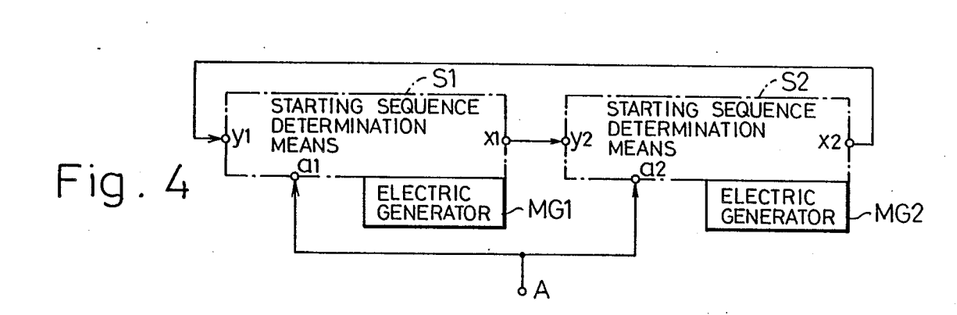
FIG. 4 is a block diagram showing another embodiment of the starting sequence determination means in the present invention.

Referring next to FIG. 4, there is shown another embodiment of the starting sequence determination means shown in FIG. 3, the means being provided here in a pair corresponding to a pair of the electric generators.

Thus, a pair of the starting sequence determination means S1 and S2 receive the start signal A when the same is provided externally when the pair of the electric generators MG1 and MG2 are ready to be started, and initiate the required processing for the start sequence determination.

Since the two starting sequence determination means S1 and S2 involve a generally very small difference in oscillation frequency of the clock pulse generators, there arises a difference in processing speed. When a plurality of processing steps have to be carried out, there arises a difference in the time required from the initiation of the starting sequence determination until its completion. A difference will arise in time required until a decision is made on whether a preparation for the starting is completed, even when the start signal A is simultaneously received.

Now, it is assumed here that the first starting sequence determination means S1 has completed the processing earlier and has provided at a terminal x1 a signal X denoting the start preparation completion. When the second starting sequence determination means S2 receives this signal X from the means S1 at a terminal y2, the second means S2 acts to interrupt the processing and not to provide the signal X at a terminal x2. Here, the first starting sequence determination means S1 senses that the signal X has not reached a terminal y1 from the second means S2, and determines that its own starting sequence is at the top, whereby the start initiation information is provided from the first means S1 to the corresponding electric generator MG1.

When the first electric generator MG1 is started, the provision of the signal X ceases. When this end of the signal X from the first starting sequence determination means S1 is detected at the terminal y2, the second starting sequence determination means S2 causes the interrupted processing for the starting sequence determination to be carried out again. When the second means S2 completes the preparation for starting, the signal X is transmitted from the terminal x2. Here, the first starting sequence determination means S1 which has already started does not provide the signal X at the terminal x1, so there exists no signal X at the terminal y2 of the second starting sequence determination means S2. Accordingly, the second means S2 determines that its own starting sequence is now the top one and provides to its corresponding electric generator MG2 information initiating the starting. As the electric generator MG2 thus started satisfies the required conditions for parallel operation with the electric generator MG1, which has already is been started and already in a state for feeding a power to the load, the connection of the pair of the electric generators into parallel operation is completed and they are ready to supply a power to the load.

Figure 5:
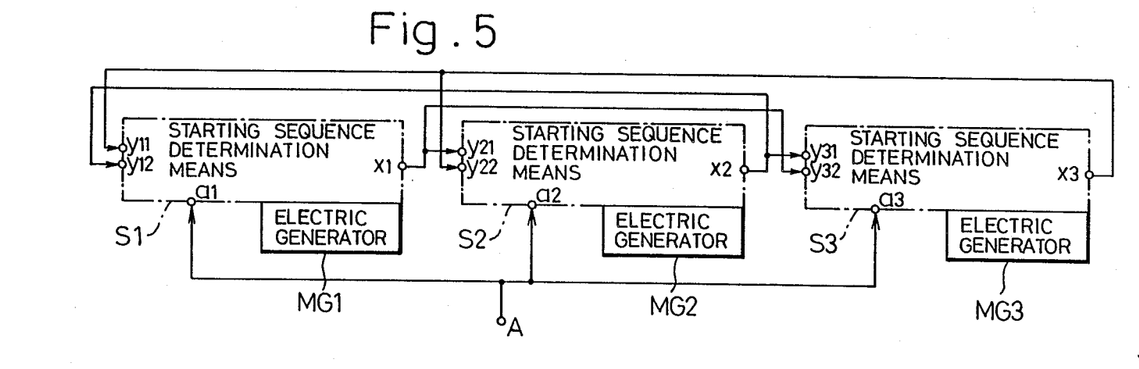
FIG. 5 shows in a block diagram still another embodiment including three of the starting sequence determination means.

While the model of FIG. 4 has been referred to for the parallel operation of the two electric generators, it is also possible to achieve the parallel operation of more than three of the electric generators. Referring to FIG. 5, there is shown an arrangement of three of the starting sequence determination means S1 to S3 for parallel operation of three electric generators MG1 to MG3. In the drawing, the three starting sequence determination means S1 to S3 are mutually connected at their input terminals a1, a2 and a3 for receiving the start signal A, and their output terminals x1, x2 and x3 are respectively connected to two further input terminals y21, y32; y31, y12; and y11, y22 of other two determination means.

It should be here assumed that the three electric generators MG1, MG2 and MG3 are all prepared to be started and, upon receipt of the start signal A externally provided, the starting sequence determination means S1-S3 start the processing required for the starting sequence determination. Here, the starting sequence determination means S1 should be assumed to provide at the terminal x1 the signal denoting the completion of the start preparation before the generation of similar signals by means S2 and S3 at terminals x2 and x3. Then, the remaining starting sequence determination means S2 and S3 which have been in the processing operation are interrupted and placed into waiting states. The determination means S1 detects that the signal Y has not reached the input terminals y11 and y12, and determines that the means is at the top of the starting sequence, whereupon the start initiating signal is provided from the determination means S1 to its associated electric generator MG1.

As the generator MG1 starts operating, the determination means S1 stops transmitting the signal X out of the terminal x1. When the remaining two starting sequence determination means S2 and S3 detect the absence of the signal X from the means S1, they execute again the processing operation for the starting sequence determination. Provided that, for example, the means S2 has completed the start preparation earlier than the means S3, the means S2 provides a signal from its terminal x2 to the input terminal y31 of the means S3, which causes the processing operation of the means S3 interrupted. The means S2 detects the absence of any signal at its input terminals y21 and y22, and the start initiating signal is provided from the means S2 to its associated electric generator MG2 to start it. The thus started generator MG2 satisfies the conditions for parallel operation with the electric generator MG1 which has been started earlier for feeding power to the load, and is placed into the parallel operation therewith.

As the electric generator MG2 starts operating, the starting sequence determination means S2 stops transmitting any signal, responsive to which the last starting sequence determination means S3 executes again the interrupted processing for the start sequence determination. As the start preparation is thereby completed at the means S3, it provides the start signal out of the terminal x3 but, since the generators MG1 and MG2 have already been started, the absence of any input signal at the terminals y— and y32 is detected so that the means S3 determines that the third electric generator MG3 can be started, and this generator MG3 is started.

As the third electric generator MG3 is thus started and placed into the parallel operation with the first and second generators MG1 and MG2 which are already operating, all of the three electric generators are in the parallel operating state, and thereby the starting of the flat frequency, constant voltage power source device comprising the three electric generators has been completed.

When any of the starting sequence determination means S1-S3 in FIG. 5 is providing a signal denoting that its start preparation has been completed and simultaneously has received signals from other means, the particular determination means is reset to execute new processing for the starting sequence determination. In this processing operation, each of the three starting sequence determination means is capable of determining that the particular means can be started, prior to a reception of any signal from other means, and this determination means is regarded to be at the top of the starting sequence so that the same will be started. This procedure is repeated, and the three electric generators can be started sequentially and placed into the parallel operation state smoothly.

When any one of the three electric generators is out of order, its own start preparation completed signal accompanying the completion of the start preparation of this particular generator or the ending of the starting sequence determination means is not provided accordingly, the remaining two operable generators are started in the sequence determined through the predetermined procedure and are placed into the parallel operation.

It should be readily appreciated by any skilled in the art that the starting sequence of even more than four of the electric generators to be placed into the parallel operation can be determined by the device according to the present invention as has been described.

Referring here again to FIG. 1, the parallel operation of the two electric generators shall be described more in details. Now, it is assumed that both switches K1 and MS1 for the first electric generator MG1 are closed, in which state the generator MG1 is converting a power from a commercial power source AC into a desired AC voltage and feeding this voltage to a load L. The second electric generator MG2 is to be started next and shifted into parallel operation with the first generator MG1. To this end, the switch K2 for the second generator MG2 is first closed to start this generator MG2. When the output voltage of the second generator MG2 has reached a desired level, the timing determination control means C2 for placing the second generator MG2 into parallel operation is actuated. An output signal $\overline{Po}$ of the control means C2 thus actuated causes the driving circuit D2 to be actuated and the electromagnetic switch MS2 is thereby closed. It should be appreciated here that the placement of the both generators into parallel operation is thereby completed.

Figure 6:
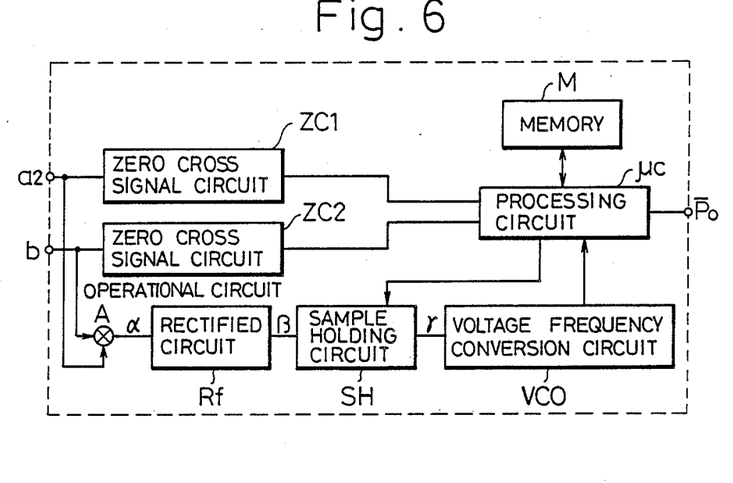
FIG. 6 is a block diagram of a timing determination control means embodiment applied to the device of FIG. 4.
Figure 7:
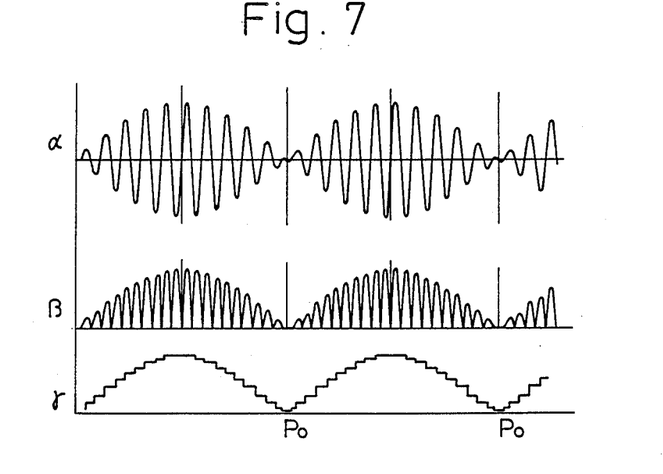
FIG. 7 is a time chart for explaining the operation of the control means embodiment shown in FIG. 6.

Referring to FIG. 6, there is shown in a block diagram an arrangement of the timing determination control means, operational waveforms of which are as shown in FIG. 7.

Such timing determination control means as denoted, for example, by C2 in the foregoing comprises a pair of parallel zero-crossing signal circuits ZC1 and ZC2 for waveform processing, operational circuit A, rectifier circuit Rf, sample holding circuit SH, voltage/frequency conversion circuit VCO, memory M and processing circuit μc. In this timing determination control means, the actuating delay time ΔT of the electromagnetic switch MS2 (see FIG. 2) is preliminarily stored in the memory M, and an output voltage a2 of the second generator MG2 and a voltage b being fed to the load (which is equal to the output voltage of the first generator MG1) are received as inputs. Thus, the zero-crossing signal circuit ZC1 receives the input signal a2 (same as the received voltage a2) and, at a time when the AC voltage of the signal a2 becomes zero, provides a signal to the processing circuit μc so that a half cycle ½f₁ of the input signal a2 is obtained at the circuit μc from the cycle of this signal, and stored in the memory M. For the input signal b (same as the voltage being fed to the load), too, a half cycle ½f₂ is obtained through the zero-crossing signal circuit ZC2 and processing circuit μc in the same manner as in the above, and is also stored in the memory M. From the half cycles ½f₁ and ½f₂, the processing circuit μc obtains the half beat cycle $1/|f_1-f_2|$ as the difference between the input signals a2 and b. The half beat cycle is also stored in the memory M.

The difference between the input signals a2 and b is obtained at the operational circuit A, an output signal α of which circuit A is full-wave rectified at the 20 rectifier circuit Rf to obtain a signal β. Thus obtained signal β is provided to the sample holding circuit SH so that peak voltage levels of sinusoidal half waves of the signal will be held, and a signal γ is thereby obtained. The voltage/frequency conversion circuit VCO generates pulses at a frequency corresponding to the voltage levels of the signal γ and provides them to the processing circuit μc, where the frequencies of thus received pulses are analyzed. The lowest frequency time of this signal γ is identified as the time point Po at which the input signals a2 and b are in-phase. Next, the processing circuit μc reads stored contents in the memory M and provides the output signal $\overline{Po}$ at the time when $(1/|f_1-f_2|)-\Delta T$ has elapsed from the time Po, so that the optimum switch closing timing for the parallel operation can be thereby determined.

Figure 8:
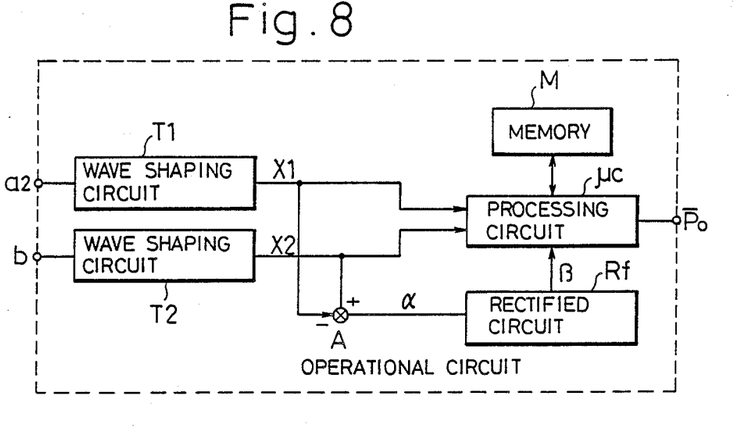
FIG. 8 shows in a block diagram another embodiment of the timing determination control means embodiment employed in the device according to the present invention.
Figure 9:
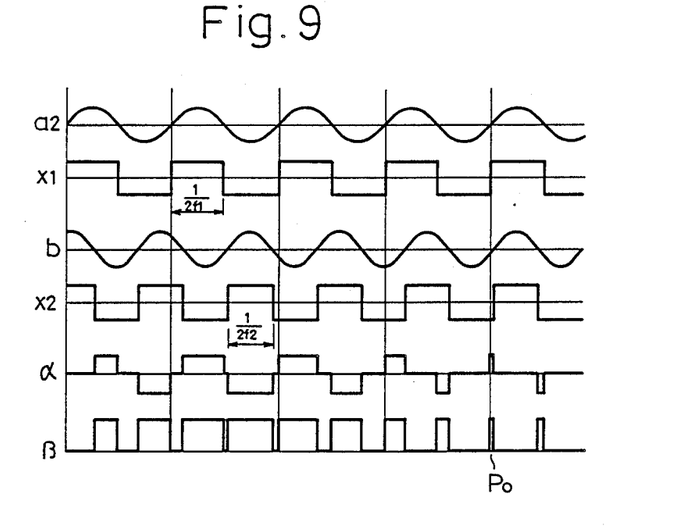
FIG. 9 is a time chart for explaining the operation of the control means embodiment of FIG. 8.

In FIG. 8, another embodiment of the timing determination control means is shown, and in FIG. 9 the operational waveforms at essential parts of this control means are shown. The timing determination control circuit of this instance comprises a pair of wave-shaping circuits T1 and T2, where the sinusoidal input signals a2 and b are converted into square-wave AC voltage signals X1 and X2, which are provided to a processing circuit μc as its inputs. The half cycle ½f₁ of the signal a2 is obtained from the pulse width of the voltage signal Xl and, similarly, the half cycle ½f₂ of the signal b is obtained from the voltage signal X2, and thus obtained half cycles are stored in a memory M. Further, an operation is carried out to obtain the half beat cycle $1/|f_1-f_2|$ from the respective half cycles ½f₁ and ½f₂, and the obtained result is also stored in the memory M. A difference is taken at an operational circuit A and an output signal α of varying pulse width is provided to a rectifier circuit Rf, whereby an output signal β is provided. The pulse width of the signal α will be the smallest at the time of the minimum phase difference between the input signals a2 and b and will be the largest when the phase difference is the largest, that is, when their phases deviate by close to 180 degrees. The processing circuit μc also measures the pulse width of the signal β and determines the time when the smallest width pulse is received as Po, that is, the time at which both input signals a2 and b have become in-phase. Thereafter the output signal $\overline{P_o}$ is provided at the time when $(1/|f_1-f_2|)-\Delta T$ has elapsed from the time Po, on the basis of the delay time $\Delta T$ of the electromagnetic switch MS2 and the half beat cycle $1/|f_1-f_2|$ which have been stored in the memory M.

Figure 10:
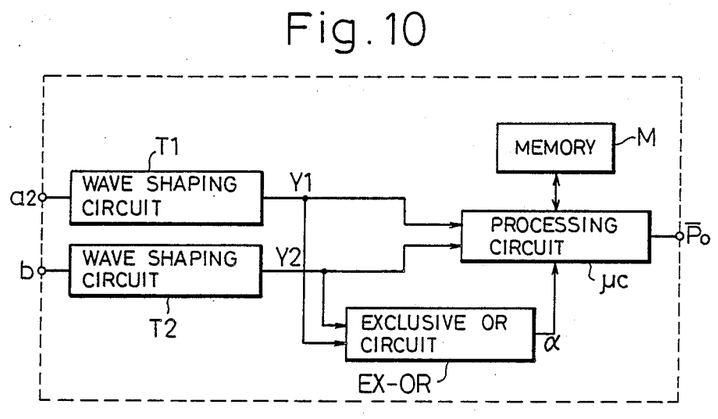
FIG. 10 shows in a block diagram still another embodiment of the control means of the present invention.
Figure 11:
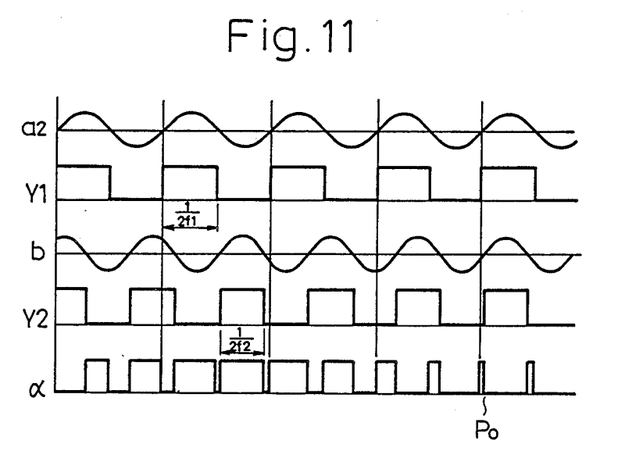
FIG. 11 is a time chart for explaining the operation of the control means embodiment of FIG. 10.

In FIG. 10, still another embodiment of the timing determination means of the present invention is shown, and its operational waveforms at essential parts are shown in FIG. 11. In the present instance, the means comprises a pair of wave shaping circuits T1 and T2, where the sinusoidal input signals a2 and b are converted to square-wave DC voltage signals Y1 and Y2, which are provided to a processing circuit μc, where the half cycle ½f₁ of the input signal voltage a2 is obtained from the pulse width of the signal Y1. The half cycle ½f₂ of the input signal voltage b is similarly obtained from the signal Y2, and thus obtained half cycles are stored in the memory M. Also these half cycles are subjected to an operation for obtaining the half beat cycle $1/|f_1-f_2|$, and thus obtained half beat cycle is also stored in the memory M. An exclusive OR circuit EX-OR receives and operates in the signals Y1 and Y2 and provides a signal α of varying pulse width. The pulse width of the signal α will be the smallest when the phase difference between the input signals a2 and b is the smallest, but will be the largest when the phase difference is the largest, that is, their phases are different by nearly 180 degrees. The processing circuit μc also measures the varying pulse width of the signal α and determines the time when the smallest width pulse is received as the time Po, upon which the both input signals a2 and b are in-phase. Thereafter the output signal $\overline{P_o}$ of the control means is provided at the time when $(1/|f_1-f_2|)-\Delta T$ has elapsed from the time Po on the basis of the delay time $\Delta T$ of the electromagnetic switch MS2 and the half beat cycle $1/|f_1-f_2|$ which have been stored in the memory M.

While in the foregoing the placing of the electric generator MG2 into the parallel operation with the generator MG1 being operated has been referred to, it should be readily appreciated by any skilled in the art that a reverse operation with regard to MG2 and MG1 is also possible in the same manner.

Figure 12:
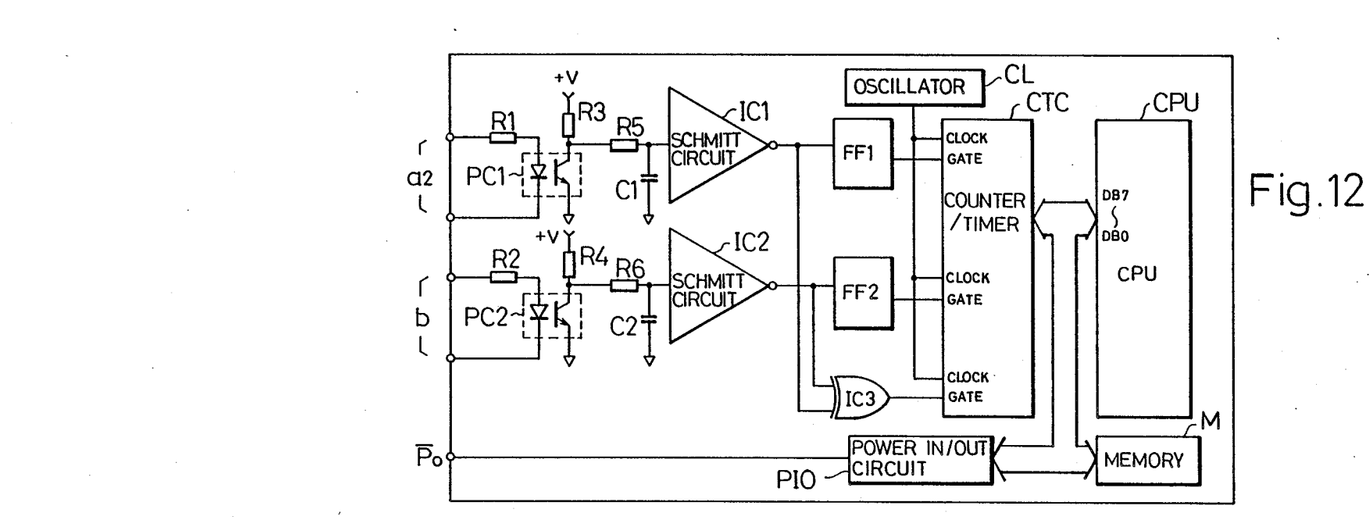
FIG. 12 is a block diagram showing a still further embodiment of the timing determination control means according to the present invention.
Figure 13:
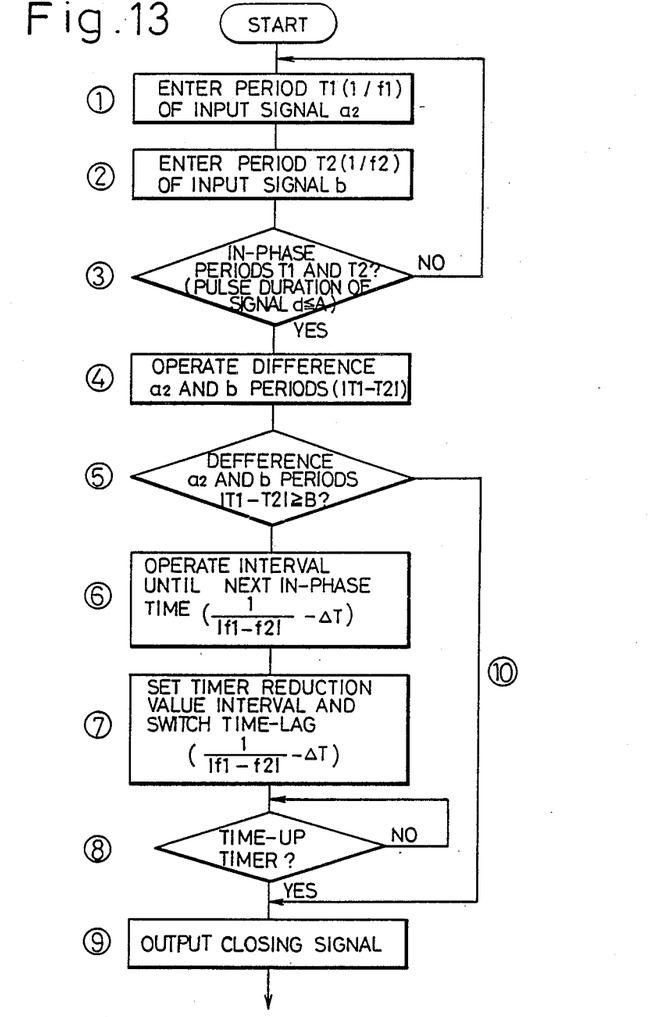
FIG. 13 is a flow chart of a program employed by the control means embodiment of FIG. 12.

FIG. 12 shows a further embodiment of the timing determination control means. A flow-chart of a program employed in actuating the control means of FIG. 12 is shown in FIG. 13. As the sinusoidal AC voltage input signals a2 and b are received by the control means embodiment of FIG. 12, they are converted to square-wave DC voltage signals through resistors R1 to R4 and photocouplers PC1 and PC2. These signals are wave-shaped at wave-shaping circuits comprising resistors R5 and R6, capacitors C1 and C2 and Schmitt circuits IC1 and IC2. Their outputs are converted to double cycle signals at flip-flops FF1 and FF2 and are provided to respective gates of a counter timer CTC.

The wave-shaped DC voltage signals of the input signals a2 and b are provided to an exclusive OR circuit IC3 to obtain phase difference between them, a signal of a varying pulse width is obtained and this signal is provided to another gate of the counter timer CTC as its input. The counter timer CTC also receives a clock signal from an oscillator CL, and counts the pulses of this clock signal only during a period in which the gate inputs are at H level. Since the cycle of the clock signal is preliminarily known, a microprocessor CPU obtains H level periods of the counter timer CTC; that is, the cycles 1/f₁ and 1/f₂ of the sinusoidal AC voltages a2 and b are obtained by providing the count number from the counter timer CTC. The thus obtained results are stored in a memory M (see also blocks ① and ② of FIG. 13).

Next the pulse signal α which is the phase difference between the input signals a2 and b is detected. Upon detection of an in-phase condition, the microprocessor CPU operates to determine the time required until the in-phase condition is reached on the basis of contents stored in the memory M, that is, $[1/|f_1-f_2|=(T_1\times T_2)/|T_1-T_2|]$ (see also blocks ④, ⑤ and ⑥ of FIG. 13). The difference between the thus processed time and the actuation delay time $\Delta T$ of the electromagnetic switch stored in the memory M, that is, $(1/|f_1-f_2|)-\Delta T$ is set in the timer (see block ⑦ in FIG. 13). Upon the lapse of the thus set time, a switch closing signal is provided as an output through a power input/output circuit PIO to the terminal Po (see blocks ⑧ and ⑨ of FIG. 13).

Upon detection of the in-phase condition of the input signals a2 and b, a comparison is made with respect to the cycle difference between the input signals a2 and b, that is, the difference between 1/f₁ and 1/f₂. When the comparison shows a value less than a fixed level (e.g., in the event the beat frequency is of a long cycle and the actuation delay time of the electromagnetic switch is negligible), a corresponding switch closing signal may be provided to actuate the electromagnetic switch actuated (see block ⑩ of FIG. 13), so that an optimum switch closing timing for the parallel operation can be attained.

In the present invention, various design modifications are possible. For example, the starting sequence determination means (see FIGS. 3 to 5) as well as the control circuit for determining closing timing of the electromagnetic switch (see FIGS. 8, 10 and 12) have been disclosed as separate from each other, but it is of course possible to provide them in an integral arrangement. That is, while the starting sequence determination means has been referred to as being provided along with the electric generator with reference to FIG. 1, as well as FIGS. 3 to 5, the starting sequence determination means may only be required to be provided in correspondence with the respective electric generators in the circuit relationship. The starting sequence determination means may be provided along with, for example, the timing determination control circuit for closing the switch. In this case, it should be readily appreciated that the microprocessor P of the starting sequence determination means may be common with such constituent element as the processing circuit μc of the timing determination circuit or the memory M.

What we claim as our invention is:
1. A flat frequency, constant voltage power source device for correcting in parallel a plurality of electric generators driven by respective induction motors receiving electrical power from a common electrical power source for supplying alternating current electric power to a common load comprising a separate electromagnetic switch inserted between each respective elec- tric generator and said common load, a separate starting sequence determination means associated with and connected to each respective electric generator for determining the sequence in which the respective generators are, one-by-one, started and connected to the common load, and a separate control means associated with each respective generator responsive to the starting sequence determination means of the respective generator for actuating the respective electromagnetic switch, each of said control means including timing determination control means connected to the respective associated electric generator for sensing the phase of the output voltage of the respective generator and a driving circuit responsive to said timing determination control means for actuating the respective electromagnetic switch, said timing determination control means comprising an actuation delay memory for storing the actuation delay time of said respective electromagnetic switch, a processing circuit connected to said actuation delay memory for comparing the output voltage of said one electric generator connected to said common load and of the next of said electric generators to be connected in parallel with said load for generating a switch closing signal incorporating the actuation delay time of the respective electromagnetic switch for the respective driving circuit retrieved from the actuation delay memory, said control means receiving the voltages generated by the respective generators, comparing the output voltage of one generator connected to said load with the output voltage of a second of the electric generators identified by said starting sequence determination means for the next sequential connection in parallel with said one generator connected to said load, determining a time for closing the respective electromagnetic switch to connect said second of the generators in parallel with said one generator connected to said load when the phase difference between the voltages produced by the respective generators is minimized, and generating and transmitting to the respective switch the switch closing signal incorporating the actuation delay time to close the switch and connect the second of the electrical generators to the load at minimized phase difference between the voltages produced by the second generator connected to the load, compensating for the time required to close said switch.

2. The device of claim 1 wherein a first of said separate starting sequence determination means connected to one of the generators comprises a clock pulse generator, a microprocessor connected to said clock pulse generator and to a start signal input terminal, a generator memory for storing information concerning the respective generator connected to and communicating with said microprocessor, an output terminal for transmitting a starting sequence determination signal to a second of said separate starting sequence determination means, a second input terminal for receiving a starting sequence determination signal from a third of said separate starting sequence determination means, and a connection terminal connected to the associated one of said electric generator for receiving therefrom the voltage produced by the respective generator, each of said separate starting sequence determination means for generating a respective start signal, the starting sequence determination means first generating an interrupting start signal interrupting generation by any of the other starting sequence determination means of any other start signals until the electric generator associated with the starting sequence determination means first generating a start signal has been started.

* * * * *

UNITED STATES PATENT AND TRADEMARK OFFICE
CERTIFICATE OF CORRECTION

PATENT NO. : 4,937,463

DATED : June 26, 1990

INVENTOR(S) : Kobayashi et al.

It is certified that error appears in the above-identified patent and that said Letters Patent is hereby corrected as shown below:

Column 10, line 63, change "correcting" to --connecting--.

Signed and Sealed this

Nineteenth Day of November, 1991

Attest:

HARRY F. MANBECK, JR.

*Attesting Officer*     *Commissioner of Patents and Trademarks*